(12) United States Patent
Karlecik-Maier

(10) Patent No.: US 7,729,142 B2
(45) Date of Patent: Jun. 1, 2010

(54) CONTROL METHOD FOR DIRECT-CURRENT BY MEANS OF A PLURALITY OF CONVERTERS

(75) Inventor: Franz Karlecik-Maier, Höchstadt (DE)

(73) Assignee: Siemens Aktiengesellschaft, Munich (DE)

( * ) Notice: Subject to any disclaimer, the term of this patent is extended or adjusted under 35 U.S.C. 154(b) by 234 days.

(21) Appl. No.: 12/067,815

(22) PCT Filed: Sep. 22, 2005

(86) PCT No.: PCT/DE2005/001708

§ 371 (c)(1),
(2), (4) Date: Mar. 24, 2008

(87) PCT Pub. No.: WO2007/033619

PCT Pub. Date: Mar. 29, 2007

(65) Prior Publication Data

US 2008/0247200 A1    Oct. 9, 2008

(51) Int. Cl.
    H02M 7/00    (2006.01)
    H02J 1/10    (2006.01)
(52) U.S. Cl. .............. 363/65; 363/67; 363/71
(58) Field of Classification Search ............. 363/34–37, 363/39, 40, 44, 65, 67, 71
    See application file for complete search history.

(56) References Cited

U.S. PATENT DOCUMENTS 4,419,591 A * 12/1983 Irokawa et al. ................ 307/45
5,984,173 A * 11/1999 Edwards ..................... 323/207
6,320,767 B1 * 11/2001 Shimoura et al. ............. 363/37
7,383,110 B2 * 6/2008 Suzuki ........................ 701/41

FOREIGN PATENT DOCUMENTS

DE            19544777        * 12/1996

* cited by examiner

*Primary Examiner*—Matthew V Nguyen
(74) *Attorney, Agent, or Firm*—Laurence A. Greenberg; Werner H. Stemer; Ralph E. Locher

(57) ABSTRACT

At least three power converters in a power distribution and power transmission system can be controlled as rectifiers or inverters and are connected together by a direct current network. A measuring direct current voltage and a measuring direct current are measured on each power converter and respectively, transmitted to the respective rectifier control and/or inverter control, and a rectifier desired direct power and/or inverter desired direct power is determined for each power converter. The total of all desired direct powers is equal to zero, and a desired direct voltage is determined from each desired direct power, the smallest inverter desired direct voltage of all connected inverters is fixed as minimal direct voltage by means of a minimal direct voltage and the desired direct voltage, a desired direct current is formed from the minimal voltage and the measuring direct voltage, a differential direct voltage is formed from the minimal voltage and the differential direct current is formed from the desired direct current and the measuring direct current. The respective rectifier control of the rectifier is controlled to minimize the total of the differential direct voltage and the differential direct current, and the inverter control of the inverter is controlled to minimize the difference between the differential direct current and the differential direct voltage.

9 Claims, 2 Drawing Sheets

CONTROL METHOD FOR DIRECT-CURRENT BY MEANS OF A PLURALITY OF CONVERTERS

BACKGROUND OF THE INVENTION

Field of the Invention

The present invention relates to a method for controlling at least three converters, which can be controlled as rectifiers or inverters and are connected to one another via a DC power supply system, in the field of power distribution and transmission.

A method such as this is already known, for example, from DE 195 44 777 C1. The method described there is used to control a so-called high-voltage direct-current transmission system, which comprises a plurality of converters, in which case the converter may be selectively operated as inverters or rectifiers. In this case, the converters are connected to one another via a DC power supply system. Transformers are provided in order to couple the converters to a respectively associated power distribution system. The direct currents and DC voltages are recorded as measured values at the respective converters in order to control the rectifiers or inverters. Furthermore, nominal value pairs in the form of a nominal current and nominal voltage are defined for each converter. Each control system calculates a control discrepancy relating to this, that is to say in other words it forms the difference between the measured values and nominal values. The rectifiers are controlled such that the sum of the control discrepancies is minimized. In contrast, the inverters are controlled such that the difference between the control discrepancies is minimized. The already known method has the disadvantage that it requires a higher control level. However, a hierarchical control structure is complex and can lead to undesirable instabilities.

BRIEF SUMMARY OF THE INVENTION

The object of the present invention is therefore to provide a method of the type mentioned initially, which has a simple structure and at the same time operates reliably and in a stable manner.

The invention achieves this object by a method in which a respective measured DC voltage and a respective measured direct current are measured at each converter and are transmitted to a rectifier control system in order to control the respective rectifier, or to an inverter control system in order to control a respectively associated inverter, a respectively associated rectifier nominal DC power and a respective inverter nominal DC power are defined for each rectifier control system and for each inverter control system, with the sum of all the rectifier nominal DC powers and all the inverter nominal DC powers being equal to zero, a respectively associated inverter nominal DC voltage is determined from each inverter nominal DC power, the lowest inverter nominal DC voltage of all the inverters which are connected to the DC power supply system is defined as the minimum DC voltage, a rectifier nominal direct current and an inverter nominal direct current are respectively calculated by means of the minimum DC voltage from each rectifier nominal DC power and from each inverter nominal DC power, with each rectifier control system forming the difference between the minimum DC voltage and the respectively received rectifier measured DC voltage, resulting in a rectifier difference DC voltage, and forming the difference between the respective rectifier nominal current and the respectively received rectifier measured direct current, resulting in a rectifier difference direct current, and controlling the associated rectifier such that the sum of the difference DC voltage and the difference direct current is minimized, and with each inverter control system forming the difference between the minimum DC voltage and the respectively received inverter measured DC voltage, resulting in an inverter difference DC voltage, and forming the difference between the respective inverter nominal current and the respectively received inverter measured direct current, resulting in an inverter difference direct current, and controlling the respectively associated inverter such that the difference between the inverter difference direct current and the inverter difference DC voltage is minimized.

Fundamentally, the invention avoids the need not only for a hierarchical structure of the control method but also for control separation.

By way of example, the power nominal values for the control systems for the converters are defined by a central control point, with the power nominal values being transmitted from the control point via an expedient form of data transmission to the individual control systems. However, the invention avoids the need for a higher-level control system, as has become known from the prior art, actively intervening in the control process in specific, previously defined situations. The control point just defines the necessary power nominal values. In fact, instead of the central higher-level control system, the lowest inverter nominal DC voltage is selected and the selected minimum DC voltage is used as the nominal DC voltage for all the control systems for the converters. This avoids excessively high DC voltages on the DC voltage side of the converters, so that the invention avoids the need for a higher-level control system. The method according to the invention is therefore decentralized, more dynamic, less complex and more stable than the methods known from the prior art. The lowest inverter nominal DC voltage is preferably selected on a decentralized basis, that is to say separately for each control system.

It should be noted that, for example, the measured values are recorded by means of current transformers and/or voltage transformers, whose output signal is in each case proportional to a monitored DC voltage, for example 500 kV, and/or to a direct current, for example 3000 A, that is produced by this DC voltage. The output signal from the current transformer or from the voltage transformer is, finally, sampled by a sampling unit in order to produce sample values, and the sample values are converted to digital measured values by an analogue/digital converter. In other words, the measured DC voltage and the measured direct current are, for example, digital measured values which are supplied to the respective control system and are processed further by its software.

Each rectifier and each inverter is advantageously controlled over the entire operating range of the rectifier and, respectively, of the inverter both on the basis of the respectively associated rectifier difference direct current and on the basis of the rectifier difference DC voltage and, respectively, on the basis of the respectively associated inverter difference direct current and on the basis of the associated inverter difference DC voltage. This expedient further development means that control limiting at the sum of or the difference between the difference direct current and the difference DC voltage can be dispensed with. This avoids control separation and even further enhances the stability of the method.

The converters are advantageously positioned physically alongside one another in order to form a back-to-back link. The back-to-back link formed in this way is used, for example, in order to couple a plurality of AC voltage power supply systems.

In one further development of the invention, which differs from this, the converters are positioned at least one kilometer away from one another in order to form a long-distance direct-current transmission system. This further development of the method according to the invention allows electrical power to be transmitted over long distances between more than two converters, as a traditional field of application of a direct-current transmission system. In this case, the converters are generally positioned such that they are separated from one another at several hundred kilometers, and are connected to one another via a direct-current link of appropriate length, and are networked and coupled to form a DC power supply system. This allows power transmission between a plurality of grid points over relatively long distances with low losses.

In one exemplary embodiment, a control point transmits the nominal DC power, as defined by the user of the method according to the invention, with details of the operating mode as a rectifier or inverter to the respectively associated control system for the converters, with each control system having means to determine the inverter nominal DC voltage from the transmitted nominal DC power. Means such as these are, for example, function transmitters with a characteristic whose profile is dependent on the design and configuration of the respective converter, and of the entire installation, and on empirical values. The inverter control systems send the nominal DC voltage determined by them to the other control systems by means of long-distance data transmission.

In the long-distance direct-current transmission process which can be carried out by means of the further development according to the invention, the respectively required nominal values, such as the respective nominal DC voltage, are interchanged between the converters by long-distance data transmission means. Expedient long-distance data transmission means include both cable-based transmission means, such as the Internet or communication via high-voltage lines, and transmission means without cables, such as radios or the like.

The rectifier and the inverter expediently each have a bridge circuit formed by thyristors. In comparison to other power semiconductor valves, thyristors operate with low losses and are used in particular for high-voltage direct-current transmission.

Each rectifier measured direct current, which is normalized with respect to a rated current, is expediently renormalized with respect to the respectively associated rectifier nominal direct current, which is likewise normalized with respect to the rated current, each inverter measured direct current which has been normalized with respect to the rated current is renormalized with respect to the respectively associated inverter nominal direct current, which has likewise been normalized with respect to the rated current, and both each rectifier measured DC voltage and each inverter measured DC voltage which have been normalized with respect to the rated voltage are renormalized with respect to the minimum voltage, with each rectifier difference direct current and each inverter difference direct current being calculated as the difference between unity and the respectively associated rectifier measured direct current, which has been renormalized in this way, and the respective inverter measured direct current, which has been renormalized in this way, and with the rectifier difference DC voltage and the inverter difference DC voltage being calculated as the difference between unity and the respectively associated rectifier measured DC voltage, which has been renormalized in this way, and the respective inverter measured DC voltage which has been renormalized in this way. According to this advantageous further development, the values are renormalized while maintaining the required transmission power, that is to say the nominal DC power. This renormalization process is particularly advantageous when operating on low loads. The marginal-current process according to the prior art has a poor control response in the low-load range even in powerful AC voltage power supply systems, that is to say in AC voltage power supply systems with a high so-called short-circuit ratio, that is to say the ratio of the power system short-circuit power to the rated power of the direct-current transmission system. By way of example, a high short-circuit ratio is 5. The further development according to the invention in contrast allows the desired operating points to be approached quickly even in the low-load range.

Advantageously, a measured turn-off angle is measured at each inverter and is transmitted to a respectively associated gamma control system, with the gamma control system comparing the measured turn-off angle with a nominal turn-off angle associated with that inverter, and, if the respective measured turn-off angle is less than the associated nominal turn-off angle, producing an inverter DC voltage nominal value which is less than the predetermined inverter nominal DC voltage, with the reduced inverter DC voltage nominal value being transmitted to all the other inverter control systems and all the other rectifier control systems, and being used to determine the minimum DC voltage. According to this further development of the invention, a gamma control system is provided in order to reliably avoid commutation errors when turning on the converter valves in each inverter. However, in contrast to the prior art, this avoids competitive control using minimum or maximum selection between a gamma control system and, for example, a current control system, for the purposes of the invention. According to the invention, the gamma control system does not operate when the installation to be controlled is being operated normally. For this purpose, for example, a gamma regulator for the gamma control system is locked to the inverter nominal DC voltage set by a user of the method. For this purpose, the gamma regulator is limited, for example at the top, to this selected inverter nominal DC voltage. If the selected nominal turn-off angle is undershot, the gamma control system, in contrast, defines an inverter nominal DC voltage which is less than the originally selected inverter nominal DC voltage as the inverter DC voltage nominal value, which is then used to determine the minimum DC voltage. For this purpose, the inverter DC voltage nominal value is advantageously sent to all the control systems. The gamma regulator also expediently has a lower control limit, which ensures that the reduced inverter nominal DC voltage does not fall below a lower threshold value.

According to a further advantageous further development of the invention, each rectifier control system has a limiting regulator which limits a rectifier regulator in this rectifier control system at the top such that a predetermined maximum current and/or a predetermined maximum voltage are/is not exceeded. The limit, which comes into force for example in the event of a fault, is used to protect the controlled systems and for additional stabilization of the method according to the invention.

According to one expedient further development relating to this, the limiting regulator limits the associated rectifier regulator when the respectively received rectifier measured direct current is greater than the sum of the respective rectifier nominal direct current and a predetermined difference direct-current discrepancy, which is in each case associated with the rectifier, or when the respectively received rectifier measured DC voltage is greater than the sum of the minimum DC voltage and a predetermined difference DC voltage discrepancy. The difference DC current discrepancy and the difference voltage discrepancy make it possible to set up any desired tolerance band in which a discrepancy between the respective measured value and the associated nominal value is permissible without infringing the rectifier control system limit as described above.

According to one expedient further development, if the rectifier measured DC voltage and/or the inverter measured DC voltage are/is falling, the rectifier nominal DC power and/or the respective inverter nominal DC power are/is reduced as a function of the respective rectifier measured DC voltage and/or as a function of the respective inverter measured DC voltage to a lower value, resulting in a respectively associated fault nominal DC power, with the rectifier nominal direct current and/or respectively the inverter nominal direct current being determined from the respective fault nominal DC power rather than from the rectifier nominal DC power and/or the respective inverter nominal DC power. The decrease in the nominal DC power is used to control the direct-current transmission system in the event of a fault in which, for example, a voltage dip occurs in one of the AC voltage power supply systems or in the DC circuit.

According to one expedient further development relating to this, the fault nominal DC power is defined using a function transmitter which is provided with a characteristic based on empirical values. In this case, the measured DC voltage is expediently smoothed, and is supplied to the function transmitter. The measured DC voltage generally has to be smoothed since the measured DC voltage may fluctuate severely in the event of a fault. The function transmitter produces a fault limiting power as a function of the smoothed measured DC voltage. This is expediently used to limit the output value of an integrator at the top, with the output value of the integrator being the fault nominal DC power. The output of the integrator is used to determine the nominal DC voltage and the nominal direct current. During normal operation, the output value of the integrator is equal to the nominal DC power selected by the user, in other words the fault handling process is inactive during normal operation. If, in contrast, the respective measured DC voltage falls below a predetermined threshold value, the function transmitter produces a fault limiting power which is lower than the nominal DC power. Initially, this is then the output value of the integrator, and therefore at the same time the fault nominal DC power. If the smoothed measured DC voltage at the input of the function transmitter rises, it produces an increased fault limiting power as the upper limit for the integrator. The integrator then integrates to the increased fault limiting power, for example at a variable integration rate. In one preferred exemplary embodiment the integration rate is made dependent on the nature and magnitude of the fluctuation in the measured DC voltage. In this case, the fluctuation of the measured DC voltage is used as an indication as to whether a given fault is still present or has already been overcome.

The method according to the invention is suitable not only for high-voltage direct-current transmission, and medium-voltage direct-current transmission but also for low-voltage direct-current transmission.

Further expedient refinements and advantages of the invention are the subject matter of the following description of exemplary embodiments of the invention, with reference to the figures in the drawing, in which the same reference symbols refer to components having the same effect, and in which:

DESCRIPTION OF THE INVENTION

Figure 1:
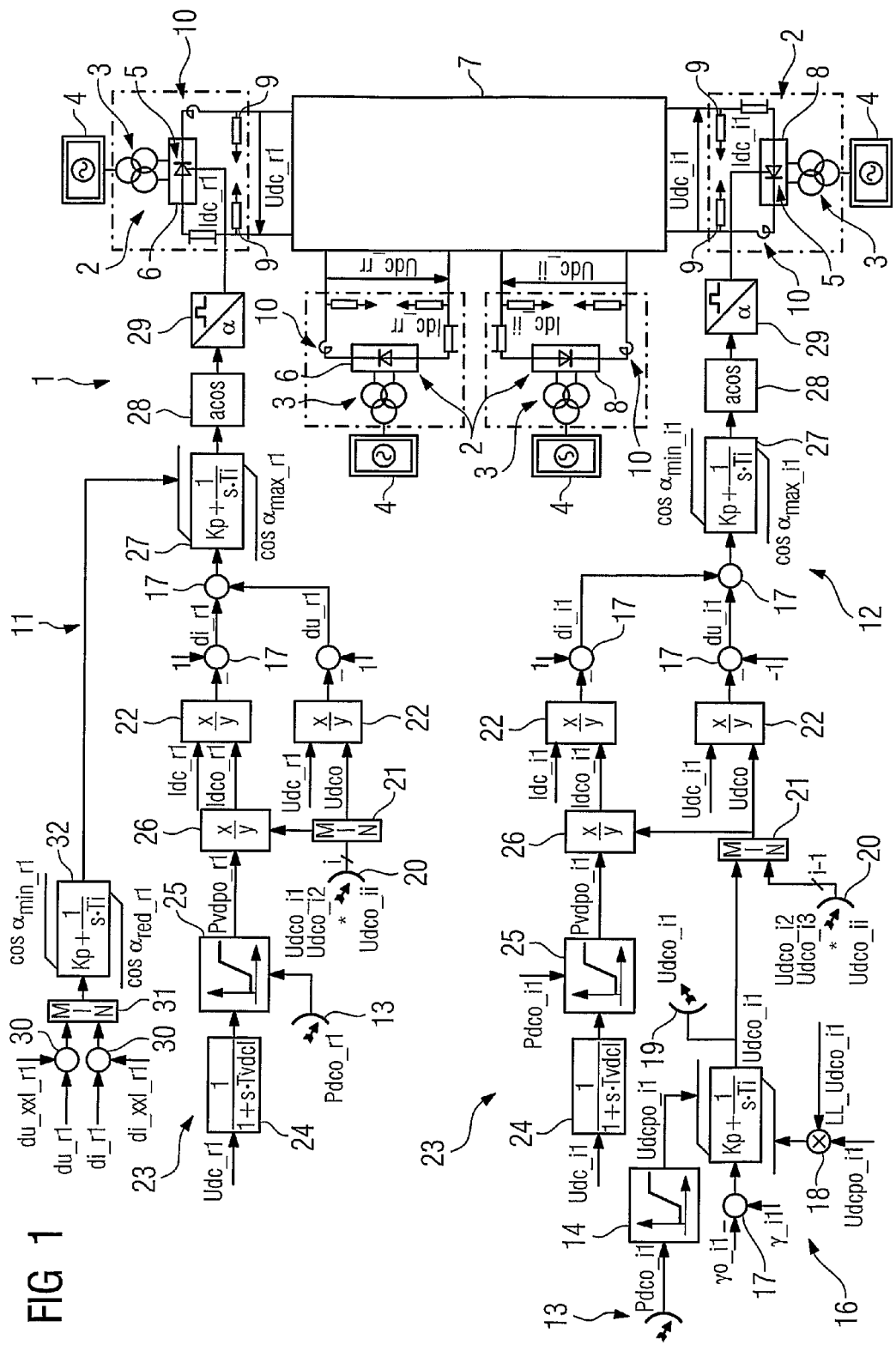
FIG. 1 shows one exemplary embodiment of the method according to the invention, on the basis of a high-voltage direct-current long-distance transmission system having a plurality of converters.

FIG. 1 illustrates one exemplary embodiment of the method according to the invention, in the form of a schematic illustration. The figure shows a so-called multiterminal high-voltage direct-current transmission (MT-HVDC) system 1 with a plurality of converters 2, which are controlled by the illustrated exemplary embodiment of the method according to the invention. The MT-HVDC system 1 has a power supply system connecting transformer 3 for each converter 2, which transformers 3 are intended to couple the respective converter 2 to an AC voltage power supply system 4. In this case, each power supply system connecting transformer 3 has a primary winding, which is galvanically connected to the AC voltage power supply system 4 and is inductively connected to two secondary windings on the power supply system connecting transformer 3. The secondary windings on the power supply system connecting transformers provide a different phase shift, therefore providing a so-called 12-pulse HVDC system 1 with a plurality of converters 2. 12-pulse MT-HVDC systems are very well known by those skilled in the art in this field, so that they do not need to be described in any more detail at this point.

The secondary windings of the power supply system connecting transformers 3 are each connected to a bridge circuit composed of thyristors 5, which are illustrated only schematically in FIG. 1. Bridge circuits such as these are likewise very well known. A more detailed description is therefore likewise superfluous in this case. The bridge circuit formed from thyristors 5 is controlled in the exemplary embodiment illustrated in FIG. 1 so as to provide a plurality of rectifiers 6. The rectifiers 6 are connected via a DC power supply system 7 to a plurality of inverters 8, with the DC circuit 7 being grounded via resistors 9 to the converters 2. Smoothing inductors 10 are provided in order to smooth the direct current and are connected in the link between each converter 2 and the DC power supply system 7. Each converter 2 may, of course, be operated both as an inverter and as a rectifier.

Each rectifier 6 and each inverter 8 has current transformers which are designed to detect a direct current flowing in the rectifier 6 associated with it or a direct current flowing to the inverter 8 associated with it. At their outputs, the current transformers produce a signal which is proportional to the direct current flowing to the rectifier 6 or to the inverter 8. The direct current can be determined from the measurement signal by the use of calibrated appliances. The measurement signal is sampled by means of a sampling unit, resulting in sample values, and the sample values are digitized by an analog/digital converter in order to produce measured direct-current values, with the measured direct-current values of the rectifiers being referred to as the rectifier measured direct current Idc_rr and the measured direct current values of the inverters being referred to as the inverter measured direct current Idc_ii.

A measurement signal which is proportional to the DC voltage which is dropped across each rectifier 6 is detected across the resistors 9. This signal is also sampled and digitized, resulting in digital measured DC voltage values, which in this case are referred to respectively as the rectifier measured DC voltage Udc_rr and the inverter measured DC voltage Udc_ii.

In the MT-HVDC system 1, the rectifier 6 and the inverter 8 are several kilometers apart from one another.

Converter control systems are provided in order to control the converters 2, with each rectifier having a rectifier control system 11, and each inverter 8 having an inverter control system 12. For clarity reasons, FIG. 1 shows only one rectifier control system 11 and one inverter control system 12.

A respective rectifier nominal DC power Pdco_r1 . . . Pdco_rr and an inverter nominal DC power Pdco_i1 . . . dco_ii are defined by a control point, which is not illustrated in the figures, for each rectifier 6 and for each inverter 8, respectively. The nominal DC powers are sent from the control point to a radio receiver 13 for each converter 2.

The inverter control system 12 will be described first of all in the following text. In each inverter control system 12, the inverter nominal DC power Pdco_i1 received by the radio receiver 13 is supplied to a function transmitter 14. The function transmitter 14 has a characteristic which is used to determine an inverter nominal DC voltage Udcpo_i1 as a function of the received inverter nominal DC power Pdco_il. The profile of the characteristic of the function transmitter is dependent on the structure, the configuration and the design of the HVDC installation, and is also based on empirical values.

The inverter nominal DC voltage Udcpo_i1 calculated by the function transmitter 14 is used as an upper limit for a gamma-PI regulator 15 of a gamma control system 16 which has means (which are not illustrated in the figures) for determining a measured turn-off angle $\gamma_{i1}$ for the associated inverter 8. Furthermore, the gamma control system 16 has a nominal turn-off angle $\gamma_0{}^{i1}$, which is applied to the negative input of the adder 17 and, in other words, is subtracted from the measured turn-off angle $\gamma_{i1}$. The gamma control system 16 has said gamma-PI regulator 15 and a multiplier 18 in addition to the adder 17. The multiplier 18 is used to define the lower limit for the gamma regulator 15 from the inverter nominal DC voltage Udcpo_i1, with Udcpo_i1 being multiplied by a factor LL_Udco_i1 which is likewise predetermined. In the illustrated exemplary embodiment the factor LL_Udco_i1 is equal to 0.7. The gamma regulator 15 is accordingly limited at the top to the inverter nominal DC voltage Udcpo_i1 and at the bottom to 70% of the inverter nominal DC voltage Udcpo_i1. During normal operation, the gamma control system 16 is inactive, so that the upper limit value Udcpo_i1 is the output value for the integrator 15 Udco_i1 at the same time. However, if commutation errors can be expected as a result of a corresponding measured turn-off angle $\gamma_{i1}$, the gamma-PI regulator 15 sets an expedient inverter nominal DC voltage Udco_i1, which is sent via a radio transmitter 19 to all the rectifier control systems 11 and to all the other inverter control systems 12. Each rectifier control system 11 as well as each inverter control system 12 has a radio receiver 20 for receiving the transmitted inverter nominal DC voltages Udco_i2, . . . , Udco_ii from all the inverters 8, or from all the other inverters 8. The inverter nominal DC voltages Udc_i1 . . . Udc_ii are compared with one another by a minimum selection unit 21, with the minimum selection unit 21 determining the lowest inverter nominal DC voltage value as the minimum DC voltage Udco. The rest of the control process for the inverter 8 and for the rectifier 6 is now carried out on the basis of the minimum voltage Udco, which is common to all the control systems.

The minimum DC voltage Udco is used for renormalization of the inverter measured DC voltage Udc_i1. For this purpose, the inverter measured DC voltage Udc_i1 and the minimum DC voltage Udco are supplied to a divider 22 which divides the inverter measured DC voltage Udc_i1 by the minimum DC voltage. The output of the divider 22 is connected to a negative input of an adder 17, with −1 being applied to its second input. An inverter difference DC voltage du_i1 is calculated in this way. The inverter difference direct current di_i1 is added to the inverter difference direct current di_i1 by means of the adder 17.

The process of determining the inverter difference direct current di_i1 will be explained in the following text. Each inverter control system 12 and each rectifier control system 11 has a limiting device 23 which comprises a smoothing unit 24 and a function transmitter 25. The limiting unit 23 decreases the originally required inverter nominal DC power or rectifier nominal DC power Pdco_i1 or the Pdco_r1, respectively, as a function of the respectively measured inverter measured DC power Udc_i1 or Udc_r1 to Pvdpo_i1 or Pvdpo_r1, respectively. This is expediently done after the collapse of the DC voltage in the event of a fault, that is to say for example in the event of a fault in one of the AC voltage power supply systems 4 or else within the DC power supply system 7. Once the fault has been rectified, the DC voltage on the DC voltage link 7 is first of all increased before the nominal DC power is raised to the original respective value Pdco_i1 or Pdco_r1. The details of the method of operation of the limiting device 23 will be described in conjunction with FIG. 2. During normal operation, the output of the function transmitter 25 Pvdpo_i1 or Pvdpo_r1, respectively, is equal to the respectively predetermined inverter nominal DC power Pdco_i1 or the rectifier nominal DC power Pdco_r1.

The output from the function transmitter 25 is supplied to a divider 26 which divides the respective nominal DC power by the minimum DC voltage Udco resulting in an inverter nominal direct current Idco_i1 or a rectifier nominal direct current Idco_r1. The inverter measured direct current Idc_i1 or the rectifier measured direct current Idc_r1 is then renormalized by means of the divider 22, and the inverter difference direct current di_i1 or, respectively, the rectifier difference direct current di_r1 is then determined by the adder 17. The inverter difference DC voltage du_i1 is subtracted from the inverter difference direct current di_i1 at the inverter 8. This is done using the equation di_ii−du_i1=1−x_Idc_i1−1+x_Udc_r1, where x_Idc_i1 and x_Udc_i1 are intended to represent the renormalized measured variables. The difference formed in this way is intended to be minimized or, in other words, regulated at zero. For this purpose, the output of the adder 17 is supplied to an inverter PI regulator 27 which determines the cosine of the trigger angle α at its output. In this case, the inverter PI regulator 27 is limited at the top and bottom to a maximum trigger angle $\alpha_{max}$ and a minimum trigger angle $\alpha_{min}$. The inverter PI regulator 27 is followed by an arccosine unit 28, which determines the arccosine and thus the trigger angle α, and supplies them to a trigger generator 29, which produces a trigger pulse for the thyristors 5 in the inverter 8, as a function of the transmitted trigger angle α.

Each rectifier control system 11 is essentially designed in a corresponding manner to the described inverter control system 12, although the rectifier control system 11 has no gamma regulator 16, and, of course, the rectifier control system 11 does not produce an inverter nominal DC voltage, but has said minimum selection unit 21 in order to define the minimum DC voltage Udco.

Like the inverter control system 12, the rectifier control system 11 also has a limiting device 23 and carries out renormalization by means of the divider 22. However, the adder 17 which precedes the PI DC voltage regulator 27 does not form the difference between the rectifier difference current and the rectifier difference voltage but, instead of these, the sum of the rectifier difference current and the rectifier difference voltage, to be precise, after renormalization, using the formula: $di\_r1 + du\_r1 = 1 - x\_Idc\_r1 + 1 - x\_Idc\_r1$.

In contrast to the inverter control system 12, the rectifier PI regulator 27 has a maximum current limit and/or maximum voltage limit. Two adders 30 as well as a minimum selection unit 31 and a PI regulator 32 are provided for this purpose. The PI regulator 32 acts on the upper limit of the rectifier PI regulator 27. The adders 30 add a maximum difference voltage discrepancy du_xx1 and a maximum difference current discrepancy di_xx1 respectively to the difference DC voltage du_r1 and to the difference direct current di_r1, in each case. If the rectifier measured direct current Idc_r1 exceeds a resultant rectifier nominal current value, which is calculated from the sum of the rectifier nominal direct current Idco_r1 and the maximum difference current discrepancy di_xx1, the rectifier measured direct current is reduced with the aid of the PI regulator 32 to the resultant rectifier nominal current value. In a corresponding manner. The rectifier measured DC voltage Udc_r1 is reduced to a resultant rectifier nominal voltage value, which is obtained from the sum of the rectifier nominal DC voltage Udco_r1 and the maximum difference voltage discrepancy du_xx1. The greatest discrepancy results from the minimum selection unit 31. For this purpose, the output of the minimum selection unit 31 is supplied to the PI regulator 32 which, at its output, produces a cosine of a control angle between $\cos \alpha_{red\_}r1$ and $\cos \alpha_{min\_}r1$. The output of the PI regulator 32 is used to limit the PI regulator 27 in the rectifier control system 11 at the top. Typical values for du_xx1 and di_xx1 are between 0.01 and 0.1. Depending on the performance of the HVDC installation, the limit $\alpha_{red\_}r$ varies between 40° and 50°. The minimum turn-off angle of the rectifier $\alpha_{min\_}r1$ is normally 5°.

At this point, it should be mentioned once again that the values to be added are, of course, normalized values. In other words, the measured values are normalized with respect to so-called rated values before renormalization.

Figure 2:
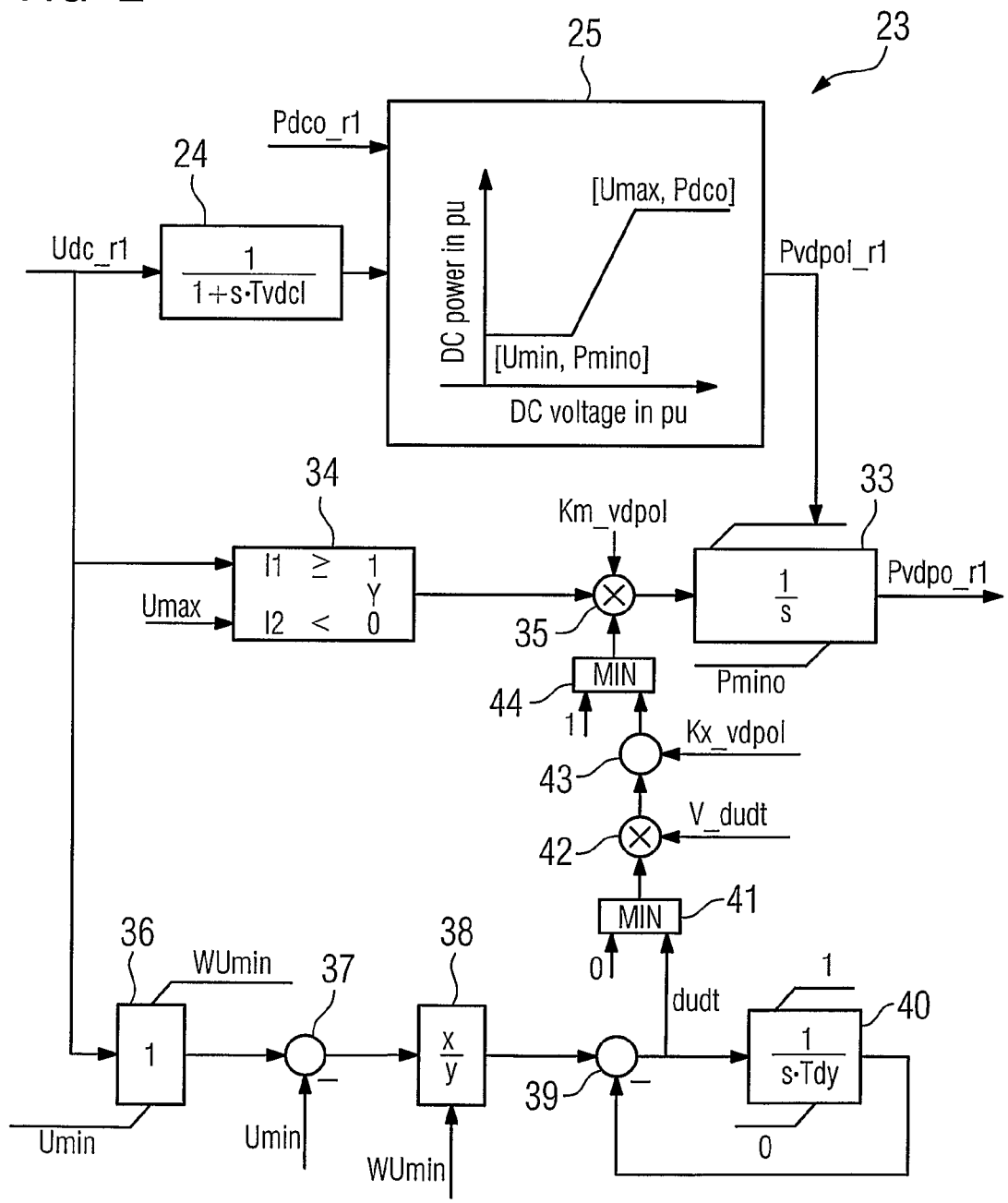
FIG. 2 shows a detail view of the installation shown in FIG. 1, in order to illustrate fault limiting in one exemplary embodiment of the method according to the invention.

FIG. 2 illustrates the effect of the limiting device 23 in more detail using the example of a rectifier 6. The rectifier measured DC voltage Udc_r1 is thus supplied to the smoothing unit 24 in order to smooth the voltage fluctuations, which frequently occur in the event of a voltage dip in one of the AC voltage power supply systems 4, or in the event of some other fault, and therefore to covert them to rectifier measured DC voltages Udc_r1 which can be processed. The smoothed rectifier measured DC voltage is supplied to the function transmitter 25 together with the rectifier nominal DC power Pdco_r1 which has been normalized with respect to the respective rated value. At its output, the function transmitter 25 produces a normalized fault limiting power Pvdpol_r1 on the basis of a characteristic that is based on the experience of the designer of the MT-HVDC system. If the smoothed rectifier measured DC voltage Udc_r1 exceeds a maximum DC voltage Umax_r1 as a threshold value, the function transmitter 25 produces the rectifier nominal DC power Pdco_r1, as applied to its input, at its output.

The output of the function transmitter 25 is used for maximum limiting of an integrator 33, with the minimum output voltage of the integrator 33 Pmino. Furthermore, a limit-value signaling device 34 with two inputs is provided. The rectifier measured DC voltage Udc_r1 is applied to the first input of the limit-value signaling device 34. The maximum voltage Umax_r1 of the function transmitter 25 is fed to the second input. The limit-value signaling device 34 compares the two input values. If the rectifier measured DC voltage Udc_r1 is greater than the maximum voltage Umax_r1, as is normally the case during rated operation, the output Y of the limit-value signaling device 34 is set to be equal to unity. If the rectifier measured DC voltage Udc_r1 falls below the maximum voltage Umax_r1 the output of the limit-value signaling device 34 will in contrast be equal to zero. A fault situation therefore results in a zero as a factor in a multiplier 35, so that the integrator 33 produces values Pvdpo_r1 between the minimum power Pmino and the maximum power Pdco_r1 as a function of the drop in the rectifier measured DC voltage Udc_r1. As can be seen from FIG. 1, the rectifier difference direct current di_r1 is in this case determined on the basis of Pvdpo_r1.

After fault rectification, the rectifier measured DC voltage Udc_r1 rises. The characteristic of the function transmitter 25 results in this leading to an increase of Pvdpol_r1 at its output. The output of the integrator 33 is, however, first of all locked at the lowest value Pvdpol_r1 which occurred while the fault existed. However, if the comparator 34 signals that the rectifier measured DC voltage Udc_r1 is above a threshold value Umax_r1, the integrator 33 integrates to the value Pvdpol_r1 produced by the function transmitter 25. Finally, Pdpo_r1, Pvdpol_r1 and Pdco_r1 match one another, so that a change is made to normal operation.

The remaining components illustrated in FIG. 2 are used for the capability to adjust the integration rate of the integrator 33 from Pmino until the rectifier nominal DC power Pdco_r1 is reached. A limiter 36 is first of all provided in order to define the integration rate, and checks whether the rectifier measured DC voltage Udc_r1 is in the range between Umin and WUmin. If Udc_r1 is below Umin, then Umin is produced at the output of the comparator 36, so that a zero signal is produced at the output of the downstream adder 37, to whose negative input Umin is applied. The divider 38 therefore likewise produces a zero signal at its output, from which previous voltage values are subtracted by means of the adder 39. The previous voltage values between 0 and 1 are produced by the smoothing unit 40 and, in the described situation, are likewise zero.

If, in contrast, the rectifier measured DC voltage Udc_r1 is between the limits Umin and WUmin, a difference voltage normalized with respect to WUmin is therefore produced at the output of the divider 38. Previous smoothed voltage values are subtracted from it by means of the adder 39. The value dudt produced at the output of the adder 39 may be positive or negative, depending on whether the rectifier measured DC voltage Udc_r1 is rising or falling. A subsequent minimum selection 41 ensures that only negative dudt values are passed on from the minimum selection 41. If the rectifier measured voltage Udc_r1 rises, the product dudt is positive and the minimum selection 41 passes on a zero to the multiplier 42, which multiplies this by the predetermined parameter V_dudt and passes the resultant product, in this case likewise zero, to the adder 43, which then adds this to the likewise predetermined parameter Kx_vdpol. The value Kx_vdpol is equal to or greater than unity. If the voltage is falling, a further minimum selection 44 therefore ensures that a value equal to unity is passed to the multiplier 35, which multiplies this unity by the output of the limit-value signaling device 34 and the likewise preselectable parameter Km_vdpol, and finally makes this available to the integrator 33. The product Y x km_vdpol×1 is equal to Km_vdpol. The integrator 33 integrates at a selected standard rate.

If the rectifier measured DC voltage Udc_r1 falls during the integration process because of a fault or because of a weak power supply system, dudt is in contrast negative. The dudt value is passed on, is multiplied by V_dudt and is finally added to Kx_vdpol by means of the adder 43, so that a value of less than unity is produced at the output of the adder 43 and is finally passed to the multiplier 35. The integrator 33 therefore increases the reduced rectifier nominal DC power Pvdpo_r1 at its output more slowly, using the new time constant determined in this way.

The invention claimed is:

1. In a power distribution and transmission system, a method for controlling at least three converters that can be controlled as rectifiers or as inverters and that are connected to one another via a DC power supply system, the method which comprises:
measuring a respective measured DC voltage and a respective measured direct current at each converter and transmitting to a rectifier control system in order to control the respective rectifier, or to an inverter control system in order to control a respectively associated inverter;
defining a respectively associated rectifier nominal DC power and a respective inverter nominal DC power for each rectifier control system and for each inverter control system, with a sum of all the rectifier nominal DC powers and all the inverter nominal DC powers being equal to zero;
determining a respectively associated inverter nominal DC voltage from each inverter nominal DC power;
defining a lowest inverter nominal DC voltage of all the inverters connected to the DC power supply system as a minimum DC voltage;
respectively calculating a rectifier nominal direct current and an inverter nominal direct current by way of the minimum DC voltage from each rectifier nominal DC power and from each inverter nominal DC power;
with each rectifier control system, forming a difference between the minimum DC voltage and the respectively received rectifier measured DC voltage, resulting in a rectifier difference DC voltage, and forming a difference between the respective rectifier nominal current and the respectively received rectifier measured direct current, resulting in a rectifier difference direct current, and controlling the associated rectifier to minimize a sum of the difference DC voltage and the difference direct current; and
with each inverter control system, forming a difference between the minimum DC voltage and the respectively received inverter measured DC voltage, resulting in an inverter difference DC voltage, and forming a difference between the respective inverter nominal current and the respectively received inverter measured direct current, resulting in an inverter difference direct current, and controlling the respectively associated inverter to minimize a difference between the inverter difference direct current and the inverter difference DC voltage.

2. The method according to claim 1, which comprises controlling each rectifier and each inverter, over an entire operating range thereof, both on a basis of the respectively associated rectifier difference direct current and on the basis of the rectifier difference DC voltage and, respectively, on the basis of the respectively associated inverter difference direct current and on a basis of the associated inverter difference DC voltage.

3. The method according to claim 1, wherein the converters are positioned physically alongside one another to form a back-to-back link.

4. The method according to claim 1, wherein the converters are positioned with a spacing distance of at least one kilometer therebetween to form a direct-current transmission system.

5. The method according to claim 1, which comprises:
renormalizing each rectifier measured in direct current, which is normalized with respect to a rated current, with respect to the associated rectifier nominal direct current, which is likewise normalized with respect to the rated current;
renormalizing each inverter measured direct current, which has been normalized with respect to the rated current, with respect to the associated inverter nominal direct current, which has likewise been normalized with respect to the rated current; and
renormalizing both each rectifier measured DC voltage and each inverter measured DC voltage, which have been normalized with respect to the rated voltage, with respect to the minimum voltage;
calculating each rectifier difference direct current and each inverter difference direct current as a difference between unity and the respectively associated rectifier measured direct current, which has been renormalized in this way, and the respective inverter measured direct current, which has been renormalized in this way; and
calculating the rectifier difference DC voltage and the inverter difference DC voltage as a difference between unity and the respectively associated rectifier measured DC voltage, which has been renormalized in this way, and the respective inverter measured DC voltage, which has been renormalized in this way.

6. The method according to claim 1, which comprises:
measuring a turn-off angle at each inverter and transmitting the measured turn-off angle to a respectively associated gamma control system;
comparing, with the gamma control system, the measured turn-off angle with a nominal turn-off angle associated with the inverter, and, if the respective measured turn-off angle is less than the associated nominal turn-off angle, producing an inverter DC voltage nominal value less than the predetermined inverter nominal DC voltage; and
transmitting the reduced inverter DC voltage nominal value to all the other inverter control systems and all the other rectifier control systems, and using the reduced inverter DC voltage nominal value to determine the minimum DC voltage.

7. The method according to claim 1, wherein each rectifier control system has a limiting regulator for upwardly limiting a rectifier regulator in the rectifier control system such that a predetermined maximum current and/or a predetermined maximum voltage are not exceeded.

8. The method according to claim 7, which comprises setting the limiting regulator to limit the associated rectifier regulator when the respectively received rectifier measured direct current is greater than a sum of the respective rectifier nominal direct current and a predetermined difference direct-current discrepancy, which is in each case associated with the rectifier, or when the respectively received rectifier measured DC voltage is greater than the sum of the minimum DC voltage and a predetermined difference DC voltage discrepancy.

9. The method according to claim 1, which comprises, if one or both of the rectifier measured DC voltage and the inverter measured DC voltage are falling, reducing the rectifier nominal DC power and/or the respective inverter nominal DC power as a function of the respective rectifier measured DC voltage and/or as a function of the respective inverter measured DC voltage to a lower value, resulting in a respectively associated fault nominal DC power, and determining the rectifier nominal direct current and/or respectively the inverter nominal direct current from the respective fault nominal DC power rather than from the rectifier nominal DC power and/or the respective inverter nominal DC power.

* * * * *